United States Patent [19]

Sykes, Jr.

[11] 4,280,479

[45] Jul. 28, 1981

[54] SOLAR HEAT COLLECTOR

[76] Inventor: Arie B. Sykes, Jr., Rte. 2, Box 170, Boonville, N.C. 27011

[21] Appl. No.: 109,867

[22] Filed: Jan. 7, 1980

[51] Int. Cl.³ ............................................. F24J 3/02
[52] U.S. Cl. .................. 126/426; 126/437; 126/450
[58] Field of Search ............... 126/429, 450, 432, 428, 126/437, 417, 426

[56]  References Cited

U.S. PATENT DOCUMENTS

| | | | |
|---|---|---|---|
| 629,122 | 7/1899 | Davis | 126/437 |
| 3,244,186 | 4/1966 | Thomason et al. | 126/428 |
| 3,387,602 | 6/1968 | Thomason | 126/432 |
| 3,894,685 | 7/1975 | Keyes et al. | 126/429 |
| 3,902,474 | 9/1975 | Pyle | 126/429 |
| 3,919,784 | 11/1975 | Tonn | 126/428 |
| 3,965,972 | 6/1976 | Petersen | 126/437 |
| 3,993,041 | 11/1976 | Diggs | 126/440 |
| 4,059,226 | 11/1977 | Atkinson | 126/429 |
| 4,084,573 | 4/1978 | Shubert | 126/429 |
| 4,132,221 | 1/1979 | Orillion | 126/450 |

*Primary Examiner*—Daniel J. O'Connor

[57] ABSTRACT

A solar heat collector that pre-heats water for a household hot water heating system, and also heats the air inside a house; the device including solar heating panels set into an A-shape, and enclosing an area therein containing a water tank and a wristatic fan that utilize the heat of the enclosed air, and transmit the thermal energy therefrom through a water line and an air line into the house.

1 Claim, 3 Drawing Figures

U.S. Patent  Jul. 28, 1981  4,280,479
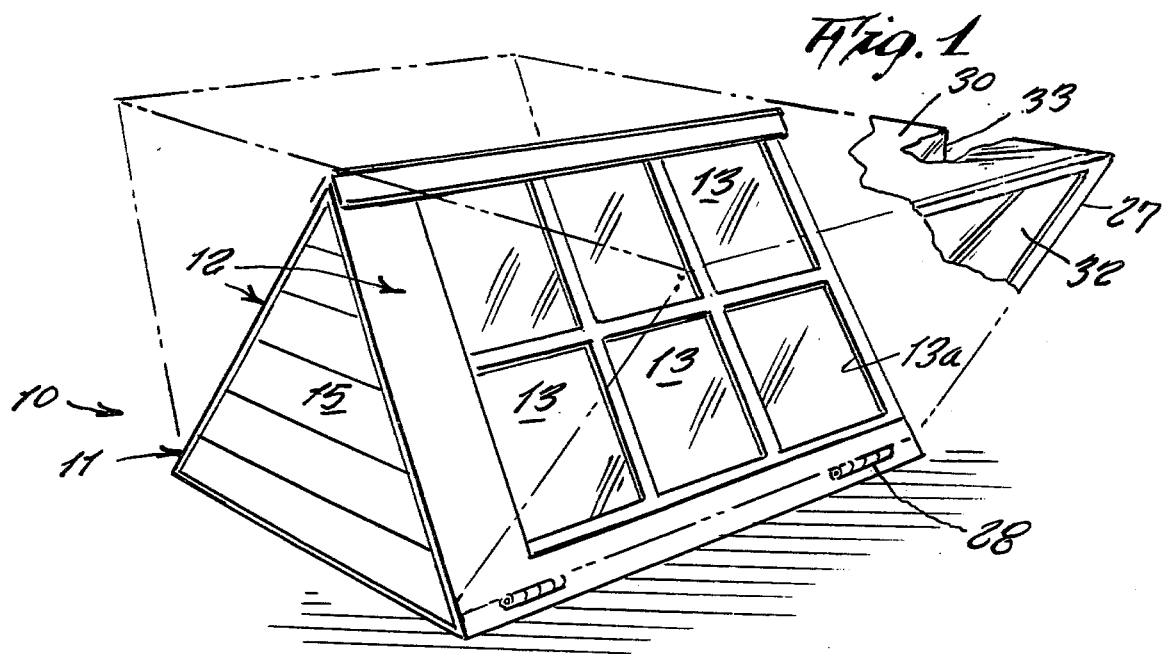
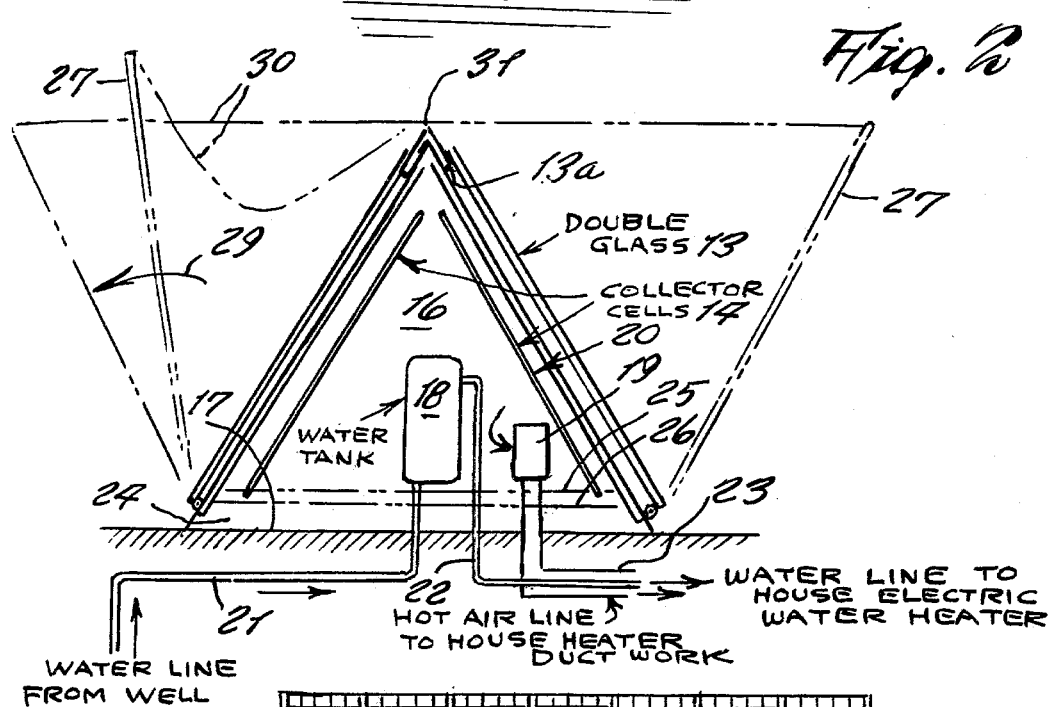
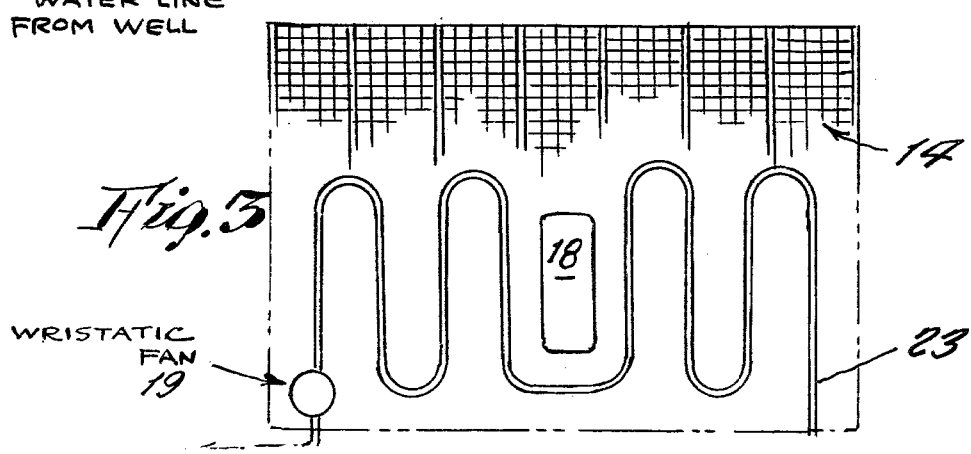

SOLAR HEAT COLLECTOR

This invention relates generally to solar heat collecting apparatus.

It is well known, that numerous solar heat collecting devices have been developed heretofore, and which generally transmit the thermal heat into hot water for circulating into a house.

It is a principal object of the present invention to provide a solar heat collector, which, in addition to the hot water supply for a house, also provides heated air for heating the air space within the house.

Another object is to provide a solar heat collector, wherein the solar heat collecting panels enclose a central air space that is heated thereby, and thus serves as a secondary heat supply, in addition to the heat transmitted to the water lines circulating through the collecting panels.

Another object is to provide a solar heat collector, that utilizes a wristatic fan, wherein the movement of hot air can be adjusted to volume and pressure, as wished.

Still another object is to provide a solar heat collector, wherein sheets of sheet metal are placed over the top of insulating rip rap rock, and then covered by sawdust, so as to help sealing against the loss of heated air; and also, wherein a course of polyethylene down, placed under the glass panels, raises the heat efficiency of the collector.

Other objects are to provide a SOLAR HEAT COLLECTOR which is simple in design, inexpensive to manufacture, rugged in construction, easy to use, and efficient in operation.

These, and other objects, will be readily evident, upon a study of the following specification, and the accompanying drawings wherein:

FIG. 1 is a perspective view of the invention, and shown including a design wherein outwardly pivotable frames, on opposite sides, support a flexible plastic thereacross, so as to enclose the solar collector further, and insulate it from excessive cold, and thus increase the efficiency thereof;

FIG. 2 is a diagrammatic end cross-sectional view of the collector, and

FIG. 3 is a side view of the collector unit, shown fragmentarily, so as to also illustrate the hot air collector around the water tank.

Referring now to the drawing in greater detail, the reference numeral 10 represents a solar heat collector, according to the present invention, wherein an A-frame type structure 11 includes upwardly inclined, opposite side frames 12, extending ten feet high, and each of which includes a plurality of double glass, flat panes 13 fitted therein. Sheets of sheet metal are placed over the top of the rip rap rock, and are then covered by sawdust. A course of polyethylene down 13a is placed under the glass panes. A panel of collector cells 14 is located directly behind each of the set of double glass panes 13. The A-frame structure includes triangular end walls 15, so that the structure 11 thus encloses a central air space 16, of generally corresponding shape, above the ground 17.

A water tank 18 and a wristatic fan 19 are placed inside the air space 16, under the collector cell unit 20 thus formed. The water tank is connected to a water line 21, that supplies fresh water thereto from a well. Another water line 22, from an upper portion of the tank, runs underground in an insulated manner from the solar heat collector 10, and to an electric hot water heater inside a house.

The fan 19 is in a hot air line 23, that also circulates between the solar heat collector and the house. As shown in FIG. 2, it is to be noted that the hot side of the water line may run through the center of the hot side of the hot air line.

The rip rap rock 24 comprises twelve tons, and is located under the collector unit. One foot of sawdust 25 covers sheets of sheet metal 26, placed over the rock.

One side wall of the structure is hinged along an upper edge thereof, so as to provide access to an interior of the device.

As shown in FIGS. 1 and 2, the above-described device may be provided with outwardly pivotable frames 27 on each opposite inclined sides thereof, the frames being pivotable about hinges 28, so that they may be pivoted outwardly, as shown by arrow 29, until a flexible, transparent plastic sheet 30, between an apex 31 of the structure and an upper edge of each frame 27, is taut. Each frame surrounds a transparent plastic sheet 32. Triangular side panels 33, of flexible, transparent plastic, extend between the side edges of the structure and frames, so as to enclose an insulating air space on each side of the structure, and thus increase the efficiency of the device in cold, windy weather.

While various changes may be made in the detail construction, it is understood that such changes will be within the spirit and scope of the present invention, as is defined by the appended claims.

What I now claim is:

1. A solar heat collector, comprising, in combination, an A-frame type, enclosing structure having inclined opposite side frames fitted with double glass panels, collector cells behind said panels, and a water tank and wristatic fan inside said structure, for supplying hot water and hot air to a house; a quantity of rip rap rock under said collector cells being covered by sheets of sheet metal and sawdust, for insulation of an interior enclosure of said structure; and a pivotable exterior frame, fitted with a transparent sheet, being hinged to a lower edge of each said side frame, each said exterior frame being a same size and same shape as said side frames, and a tent-like, flexible, transparent sheeting supported upon said structure and exterior frames, said sheeting extending between an apex of said A-frame type structure and the upper edge of each said exterior frames, said sheeting being in a taut position when said exterior frames are outwardly pivoted and in inclined position, so as to form an insulating space between each of said side frames and said exterior frame; and a triangular, flexible, transparent sheet between a side edge of each said side frames and said exterior frame, closing opposite side ends of said space.

* * * * *